3,668,018
METHOD OF AUTOMATICALLY CONTROLLING THE LOCATION OF A NOZZLE IN HEAT TREATMENTS BY HOT GAS FLAMES
Yoshiaki Arata, Amagasaki, and Katsunori Inoue, Ashiyashi, Japan, assignors to Iwatani & Co. Ltd., Osaka, Japan
Filed Feb. 24, 1969, Ser. No. 801,286
Claims priority, application Japan, Apr. 30, 1968, 43/28,902
Int. Cl. B23k 7/00
U.S. Cl. 148—9.5
4 Claims

ABSTRACT OF THE DISCLOSURE

The distance between a gas flame nozzle used in heat treating and the work is automatically controlled so that the heat is transferred most effectively to the work. Electrodes adjacent to the nozzle project down toward the flame and detect any variation in electrical characteristics of the flame, the detected values being transmitted in the form of control signals to an automatic control system which maintains the nozzle at optimum distance from the work.

BACKGROUND OF THE INVENTION

Many heat treatments are performed by allowing a hot gas flame to impinge on the work. Such treatments include inter alia, gouging, scarfing and annealing. A combustable gas or gas mixture is directed through a nozzle to be burned and the burning gases collide with the work where they assume a more or less laminar flow and spread radially over the work. It is necessary that the nozzle be maintained at a distance from the work which is within certain limits. This distance will depend on such factors as the gas or gases being burned, and their relative proportions, their flow rate and, of course, the material from which the work is made. The distance cannot be too large or too small if the work is to be heated efficiently and, in cutting operations, the distance between nozzle and work must be controlled if the oxygen is to flow effectively to the work.

In industrial heat treatments, the nozzle is usually on a carriage so that it may be moved automatically and quickly over the work. The clearance between the nozzle and the work will often vary because the work varies in thickness over its area or because of warpage, imperfect installation or any number of other reasons. As a result, even if a nozzle is initially adjusted so that for a given operation it is an optimum distance from the work, the clearance between nozzle and work will not remain the same when the nozzle is passed over the work.

Nozzle clearance can be visually adjusted but this is not practical when the nozzle is on a moving carriage. Attempts have been made to provide devices which detect variations in nozzle clearances but the methods and means so far devised have been too complicated and have not been reliable, durable and economical to permit commercial success.

SUMMARY OF THE INVENTION

It is an object of this invention to overcome the deficiencies found in the prior art such as those discussed above. Variation in nozzle clearances is detected by making use of electrical characteristics of burning gas being discharged at the nozzle. The variation is detected by electrodes which are adjacent to the nozzle and which project toward the work.

DETAILED DESCRIPTION OF THE PREFERRED EMBODIMENT

Figure 1:
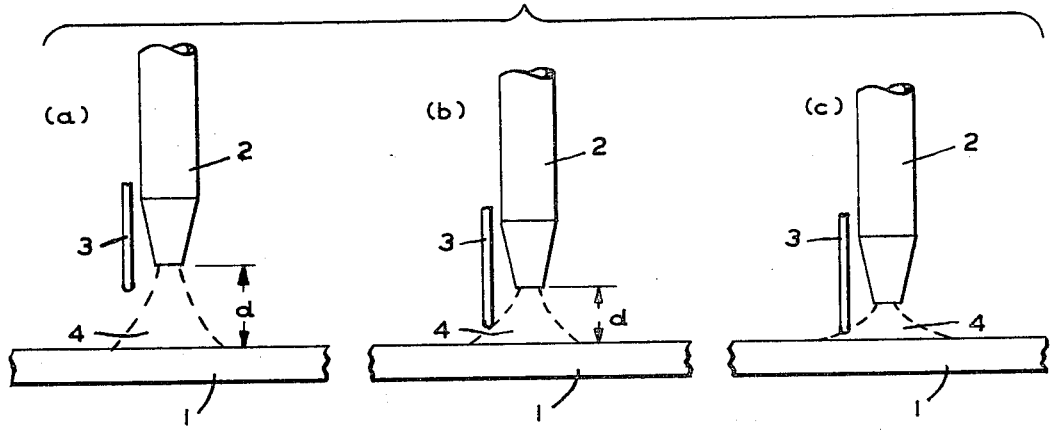
FIG. 1 shows a heat treatment nozzle and an associated electrode at various distances from work being heat treated by burning gas flowing out of the nozzle.

FIG. 1 shows work 1 being heat treated by burning gas flowing out of a nozzle 2. An electrode 3 is connected with but electrically insulated from the nozzle 2. The nozzle 2 is shown in FIG. 1 at three different distances with respect to the work 1 and feeding gas to the flame 4. It has already been explained that for various reasons the clearance between nozzle and work will vary and it has also been explained that burning gases coming out of a nozzle tend to flow parallel to work if they impinge against it. Thus, as shown in FIG. 1(a), if the nozzle 2 is a large distance $d$ from the work 1 the electrode 3 will not contact the hot gas flame 4. In FIG. 1(b) the distance $d$ between the nozzle tip 2 and work 1 is optimum and when the nozzle 2 is in this position the tip of the electrode 3 makes contact with the upper portion of the gas flame 4. When the nozzle 2 is too close to the work 1 as shown in FIG. 1(c), the electrode 3 will extend down into the gas flame 4 so that the tip of the electrode 3 is well into the flame.

Figure 2:
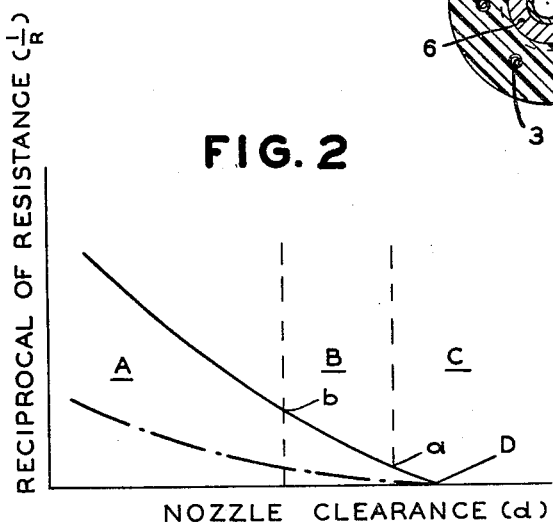
FIG. 2 is a graph showing the relationship of the reciprocal of resistance between the electrode of FIG. 1 and the nozzle and between that electrode and the work both plotted against nozzle clearance.

The variation in distance between the nozzle 2 and the work 1 and the corresponding variation between the distance between the electrode 3 and the work 1 and the consequent degree of penetration of the electrode 3 into flame 4 can be detected electrically because of the fact that gas flames possess electrical characteristics similar to those of an ionized plasma fluid. The electrical resistance between the electrode 3 and the nozzle 2 and the resistance between the electrode 3 and the work 1 will both decrease as the electrode 3 projects farther into the flame 4. This relationship is graphically illustrated in FIG. 2. The relationship between the reciprocal of resistance between the electrodes 3 and the work 1 and between the electrodes 3 and the nozzle 2 is shown in full line for an electrode of positive polarity and in dot-dash line for an electrode of negative polarity. The area A of the graph of FIG. 2 shows the reciprocals of resistances when the nozzle 2 is too close to the work 1. The area B shows reciprocals of resistances when the nozzle 2 is neither too far away from nor too close to the work 1. Area C relates to the situation where the nozzle is too far away from the work 1.

Figure 3:
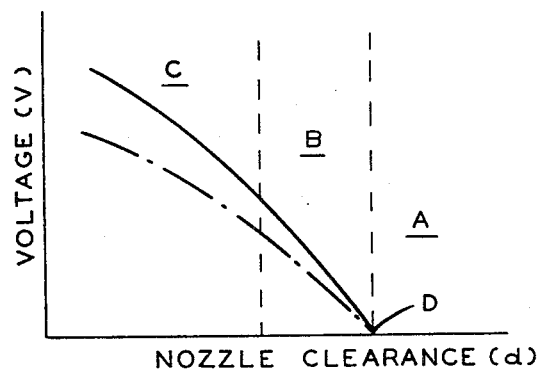
FIG. 3 is a graph showing the electromotive force between the electrode of FIG. 1 and the nozzle as well as between the electrode and the work both plotted against nozzle clearance.

With regard to electromotive force, similar relationships exist between the electrode 3 and the work 1, and between the electrodes 3 and the nozzle 2. FIG. 3 is a graph showing the non-load voltage versus the nozzle clearance. The full line represents the voltage between the electrode 3 and the work 1 at various nozzle clearances and the dot-dash line indicates voltage between the nozzle 2 and the electrode 3 at various nozzle clearances. As in FIG. 1, the graph of FIG. 2 is divided into three areas, A, B and C. The area A corresponds to the situation where the nozzle clearance is too small. The area B corresponds to the case where the distance between nozzle and work is within acceptable limits and area C shows voltage in the situation where nozzle clearance is excessively large.

In both graphs (FIGS. 2 and 3) D represents the point where the electrode becomes separated from the hot gas flame 4.

Figure 4:
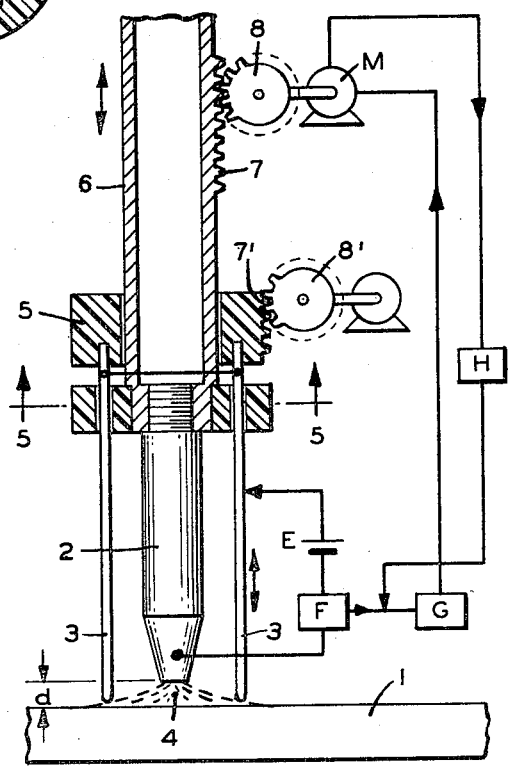
FIG. 4 is a schematic view of an apparatus constructed in accordance with the present invention.

FIG. 4 shows apparatus for performing the method of the present invention. Above the work 1 the nozzle 2 is supported by a holder 6 but is electrically insulated from that holder as shown. The holder 6 is mounted on an automatic carrier (not shown) and has adjacent its lower end a flange 5 of non-conductive material. A plurality of electrodes 3 have their upper ends inserted into the flange 5 so that the electrodes are supported thereby and extend downwardly toward the work 1. The holder 6, which is tubular in design so that gases can be fed through it to the nozzle 2, has teeth 7 formed on its outer surface which mesh with a pinion gear 8. The pinion 8 may be rotated by a servo-motor M. This, of course, will raise and lower the holder 6 and the nozzle 2. A flange 5 has, on its outer face, teeth 7' which mesh with the pinion gear 8' which may be rotated by a motor to raise and lower the flange 5 and its associated electrodes 3. Since the flange 5 is freely slidable on the holder 6, rotation of the pinion 8 will not move the electrodes 3, and rotation of the pinion 8' will not move the nozzle 2. Thus, once the electrodes 3 have been adjusted so that they are a given distance from the work 1, the servo-motor M can raise or lower the nozzle 2 but not change the position of the electrodes 3. In order to assure that the electrodes 3 will be properly aligned, they extend through a flange as shown in cross-section in FIG. 5. Each of the electrodes 3 are slidable in a hole which extends through the flange of FIG. 5.

Figure 5:
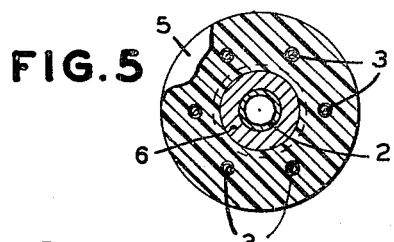
FIG. 5 is a view in section taken substantially along the line 5—5 of FIG. 4.

A D.C. power source E and a pre-amplifier F are connected between the electrodes 3 and the nozzle 2. As shown in FIGS. 4 and 5 all of the electrodes 3 are connected electrically below the flange 5 to assure that they are all of the same potential. It is to be noted that it is apparent from FIGS. 2 and 3 that electrodes charged positively and a nozzle charged negatively are more effective in detecting variation in nozzle clearance than when the converse is the situation. The pre-amplifier F is connected to the servo-motor M through a servo-amplifier G. H is a tachogenerator which tends to stabilize the control system when it is applied with negative feedback.

The servo-control system of FIG. 4, which comprises a D.C. power source E, a pre-amplifier F, a servo-amplifier G, a servo-motor M, a tachogenerator H, pinion 8 and teeth 7, is actuated as a unit to maintain the nozzle clearance so that the current flowing from the D.C. power source E will correspond to that of resistance R in area B in FIG. 2. If the nozzle clearance $d$ becomes too large the resistance R will exceed the value at point $a$ (FIG. 2) and the servo-control system will shift the nozzle 2 down until the nozzle clearance is within acceptable limits. On the other hand an excessively large distance between the nozzle 2 and the work 1 will cause the resistance R to decrease below the value indicated in FIG. 2 as $b$. When this happens the servo-control system will raise the nozzle 2 so that the nozzle clearance is increased.

It has been explained that the servo-control mechanism may be actuated through electromotive activity generated by the hot gas flames between the electrodes 3 and the nozzle 2. If the nozzle clearance becomes excessively large there is a large voltage between the nozzle and the electrode and the automatic control system is actuated to move the nozzle 2 down to an acceptable position. If the nozzle clearance becomes too small the voltage between the nozzle 2 and the electrodes 3 will approach zero and the nozzle 2 will be raised so that the clearance between it and the work 1 comes within acceptable limits. Since the voltage between the nozzle 2 and the work 1 is related to the nozzle clearance in much the same way as the voltage between the nozzle 2 and the electrodes 3, it can also be used to correct nozzle clearance.

It is preferable that when the nozzle clearance is within acceptable limits, the electrodes just barely contact the hot gas flame 4, that is, their lower tips barely extend into the gas flame. It is also preferred that the electrodes be made of a material having a high melting point. An example of such a material is tungsten.

It has already been explained that it is advantageous to have the electrodes of positive polarity. Thus, the electrodes 3 should be positively charged even when oxide films are produced on the work. This is so because electric current through hot gas flames is influenced somewhat by negatively charged electrodes when they are in contact with the flames. For this reason it is preferred that the nozzle 2 be of negative polarity and that the electrodes be of positive polarity.

Optimum nozzle clearance varies in accordance with the particular heat treatment being performed. Therefore, the distance between the electrodes and the work should be arranged in advance depending on the optimum nozzle clearance.

In the preferred embodiment the variations of electric current which are brought about by changes in the resistance or electromotive force which are present between the electrode 3 and the nozzle 2 are used to control nozzle clearance. It has already been explained that the voltage or resistance between the electrodes 3 and the work 1 could be used to effect control. In such a case, the D.C. source E and the pre-amplifier F would be connected between the electrodes 3 and the work 1. Although several electrodes 3 are used in the preferred embodiment one could be employed and function satisfactorily. Other controlling devices may be employed such as an oil-hydraulic or water-hydraulic system or an air pressure system. The preferred embodiment uses a motor which raises and lowers the nozzle but it would be possible to use a motor only to raise the nozzle, the descent thereof being caused by gravity.

In the preferred embodiment an integral control system having a servo-amplifier has been employed. If the nozzle clearance does not have to be controlled to such a degree of precision as in the preferred embodiment, an on-off control system, with an amplifier, a logical operation circuit and a relay may be employed to actuate a motor to control nozzle clearance.

The advantages of the present invention, as well as certain changes and modifications of the disclosed embodiments thereof, will be readily apparent to those skilled in the art. It is the applicant's intention to cover all those changes and modifications which could be made to the embodiments of the invention herein chosen for the purposes of the disclosure without departing from the spirit and scope of the invention.

We claim:

1. A method of controlling the clearance between a gas nozzle and work being heat treated by gas flames emitting from said nozzle comprising the steps of providing at least one electrode at a positive D.C. potential with respect to said nozzle, said at least one electrode extending in proximity to said gas flames, measuring the electric resistance between said electrode and said nozzle, and transmitting a signal proportional to the value of said resistance to an automatic control system in the form of control signals so that said system will control the nozzle clearance to bring the value of said resistance between predetermined limits.

2. A method of controlling the clearance between a gas nozzle and work being heat treated by gas flames emitting from said nozzle comprising the steps of providing at least one electrode at a positive D.C. potential with respect to said work, said at least one electrode extending in proximity to said gas flames, measuring the electric resistance between said electrode and said work, and transmitting a signal proportional to the value of said resistance to an automatic control system in the form of control signals so that said system will control said nozzle clearance to bring the value of said resistance between predetermined limits.

3. A method of controlling the clearance between a gas nozzle and work being heat treated by gas flames emitting from said nozzle comprising the steps of providing at least one electrode at a positive D.C. potential with respect to said nozzle, said at least one electrode extending in proximity to said gas flames, measuring the electromotive force between the electrode and the nozzle, and transmitting the value of said electromotive force to an automatic control system in the form of control signals so that said system will control the nozzle clearance to bring the value of said electromotive force between predetermined limits.

4. A method of controlling clearance between a gas nozzle and work being heat treated by gas flames emitting from said nozzle comprising the steps of providing at least one electrode at a positive D.C. potential with respect to said work, said at least one electrode extending in proximity to said gas flames, measuring the electromotive force between the electrode and the work and transmitting the value of said electromotive force to an automatic control system in the form of control signals so that said system will control the nozzle clearance to bring the value of said electromotive force between predetermined limits.

References Cited

UNITED STATES PATENTS

| | | | |
|---|---|---|---|
| 2,534,958 | 12/1950 | Deming | 148—9 |
| 2,747,152 | 5/1956 | Greene | 148—9 |

DELBERT E. GANTZ, Primary Examiner

C. E. SPRESSER, Jr., Assistant Examiner

U.S. Cl. X.R.

148—9 R